April 14, 1970   M. J. ONIFER, JR., ET AL   3,506,522
FLOATING MANDREL PIPE MACHINE Filed Oct. 7, 1966   4 Sheets-Sheet 3

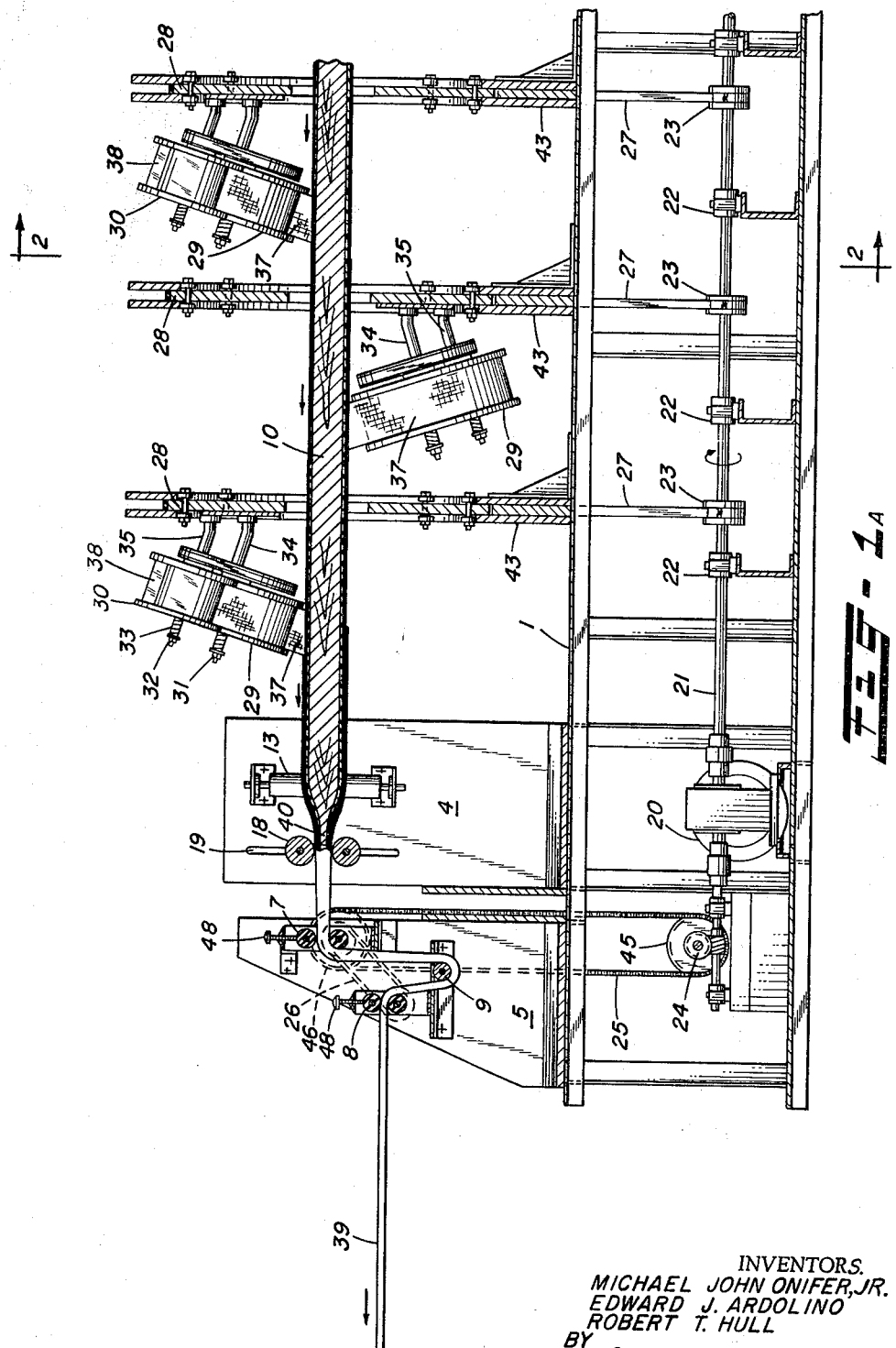

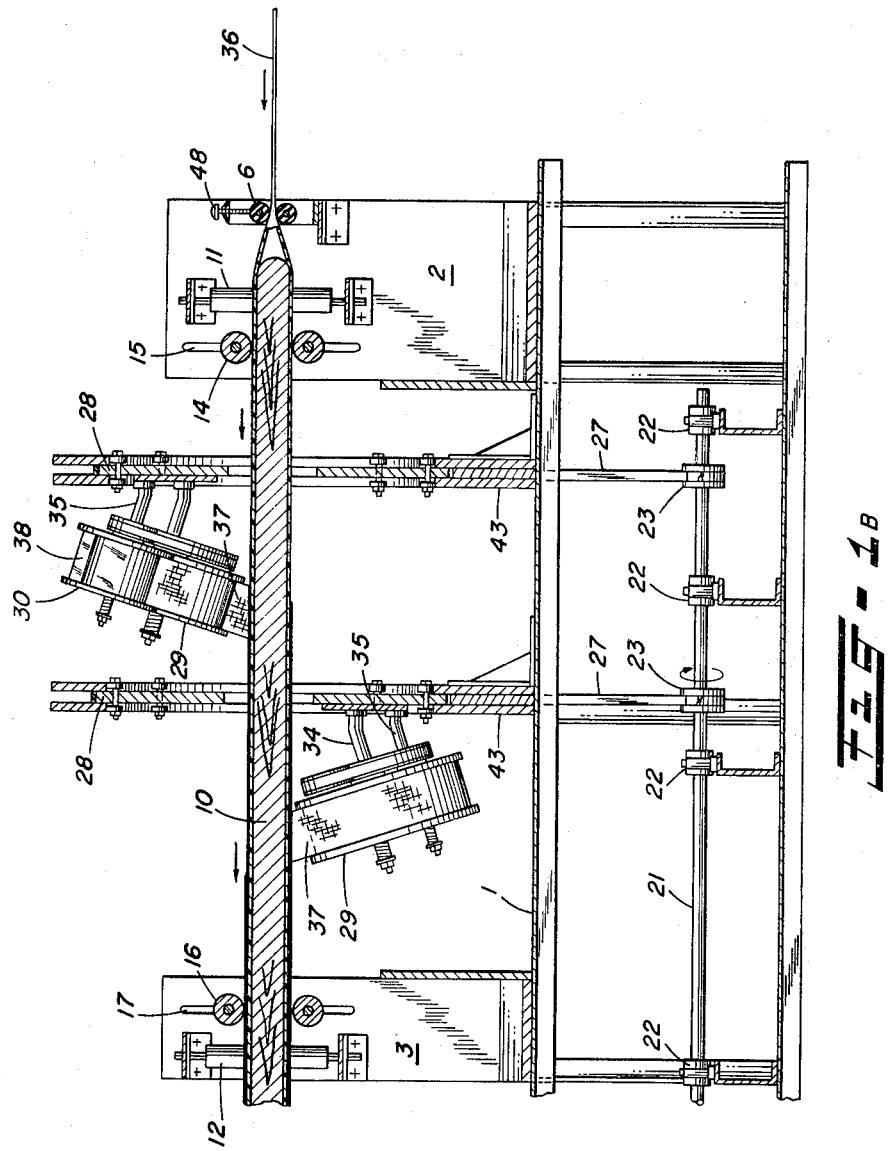

INVENTORS.
MICHAEL JOHN ONIFER, JR.
EDWARD J. ARDOLINO
ROBERT T. HULL
BY
ATTORNEY

April 14, 1970    M. J. ONIFER, JR., ET AL    3,506,522
FLOATING MANDREL PIPE MACHINE
Filed Oct. 7, 1966    4 Sheets-Sheet 4

INVENTORS.
MICHAEL JOHN ONIFER, JR.
EDWARD J. ARDOLINO
ROBERT T. HULL
BY
ATTORNEY

United States Patent Office 3,506,522
Patented Apr. 14, 1970

3,506,522
FLOATING MANDREL PIPE MACHINE
Michael John Onifer, Jr., Elkton, Robert Thomas Hull, Havre de Grace, and Edward John Ardolino, Baltimore, Md., assignors to American Cyanamid Company, Stamford, Conn., a corporation of Maine
Filed Oct. 7, 1966, Ser. No. 585,161
Int. Cl. B31c *13/00*
U.S. Cl. 156—432                    5 Claims

ABSTRACT OF THE DISCLOSURE

This invention relates to an apparatus for the continuous production of composite plastic pipe in which a floating, relatively rigid, mandrel having one rounded end and the other end flattened in the form of a duck bill projection is used.

---

This invention relates to a floating mandrel pipe machine for manufacturing flaccid plastic pipe, the pipe being wound with spiral tapes of reinforcing material impregnated with thermosetting resin to form an outer layer, the improvement comprising a rigid floating mandrel over which the flaccid pipe is stretched during spiral winding.

Multi-layer plastic pipes with a thermoplastic liner and a reinforced thermosetting resin outer layer have achieved considerable success, as they are light, the inner thermoplastic liner is highly corrosion resistant, and the materials of which the pipe is made are of moderate cost. When an ordinary fixed mandrel is used, the pipe is formed in lengths which, in use, have to be fitted together and which are relatively bulky to transport.

The disadvantages of short lengths of pipe have been overcome by a process in which a liner of thermoplastic material is inflated, wound with spiral windings of fabric impregnated with thermosetting resin, for example uncured fiberglass, and then flattened out or deflated. The thermoplastic inner liner can be fed onto the inflated mandrel in a preformed shape as a tube, seamed or seamless, or it may be formed on the end of the liner from a continuous sheet using conventional sealing means to form a seam, such as for example heat or ultasonics. In either case it should be noted that a continuous pipe of thermoplastic is moving off the mandrel. In this form the pipe can be wound onto reels which can carry a long length of pipe. In use, the pipe is then laid, inflated, and the thermosetting resin cured, for example by inflating with steam or other higher temperature fluid. This form of continuous pipe presents so many advantages over the discrete lengths of pipe which were previously produced that it has taken over a large and growing portion of the plastic pipe market. Efficient as the continuous pipe is, there have been some disadvantages in the production. First of all, the inflation of the liner passing over inflated bags presents some problem of accurately adjusted pressure; and if the liner is not stretched and a uniform surface provided for the winding, the layer of thermosetting resin impregnated material may not be perfectly smooth, and wrinkles may be formed unless great care is taken.

The present invention relates to a process and apparatus for forming composite continuous pipe in which the drawbacks of the inflated mandrel process described above are eliminated and uniform, unwrinkled outer reinforcing layer is produced with excellent output and a high degree of uniformity. A rigid mandrel is used, with all of the advantages encountered in the rigid mandrel machines and processes for producing discrete lengths of pipe, and at the same time a continuous process is retained for producing pipe which can be flattened out and wound on reels. Essentially in the present invention a rigid mandrel which floats on rollers and is provided with a tapered and flattened end is held in place against axial movement by rolls which are spaced a distance less than the full diameter of the mandrel. The plastic liner or pipe is drawn over the floating mandrel at one end, and spiral tapes of fabric impregnated with uncured thermosetting resin are wound around it while on the mandrel, and finally the pipe is drawn off the mandrel, flattened and wound on large reels.

It is an advantage of the present invention that the thermoplastic liner may be of either of the types described above in connection with the inflated mandrel process. In other words, the inner thermoplastic liner may be in the form of a pre-formed tube, seamed or unseamed, or a continuous sheet of thermoplastic may be formed into the tube on the inlet end of the mandrel using the conventional sealing means, such as heat or ultrasonics. The use of a pre-formed plastic liner presents some operating advantages and is therefore preferred although the invention is not limited thereto. In the more detailed description which follows this preferred form of thermoplastic liner will be described.

The mandrel may be of any desired material, such as for example wood, and may be solid or hollow. As in other composite pipes, the reinforcing layer may be any desired number of layers of spirally wound impregnated tapes.

The invention relates essentially to a process and apparatus, and it is an advantage that the nature of the thermoplastic inner pipe or liner and the spirally wound reinforcing layer are not thereby changed. Accordingly, the invention is not concerned with the chemical composition of the layers and is not limited. A very satisfactory combination is a polyolefin inner liner, such as polypropylene, with epoxy resin impregnated fiberglass ribbons winding the outer or reinforcing layer. Other materials may be used, for example polyester impregnated glass fabric or other fabrics, such as dynel. It is also an advantage of the present invention that it may be used to produce composite pipes of different sizes, of course using a floating mandrel of suitable dimensions for the pipe size.

The invention will be described in greater detail in conjunction with the drawings, in which:

FIGS. 1A and 1B show a horizontal section through the machine;

Figures 2, 3:
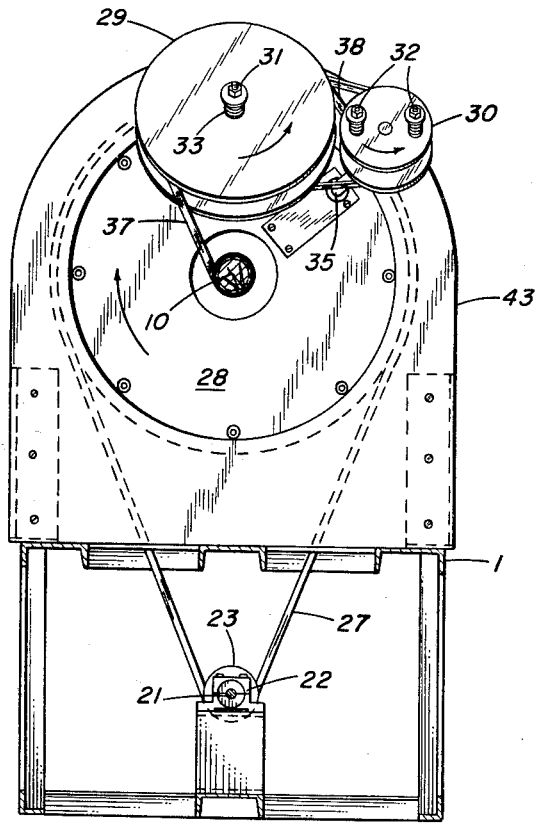
FIG. 2 is an end view for one winding station taken at the point 2—2 of FIG. 1A, the elevation looking in the direction of the arrows.
FIG. 3 is an elevation of the mandrel with pipe removed.

Turning to FIGS. 1A and 1B, which show a longitudinal section through the machine, FIG. 1B showing the inlet end of the machine receiving the plastic inner liner 36 and FIG. 1A showing the machine with its discharge end off which the composite pipe 39 is taken. Because of the length of the machine, it is shown on the two sheets of drawings with the machine broken away in the middle. The machine is mounted on a steel framework 1 which extends through the whole length of the machine and on which there is mounted an input pedestal 2, a center guiding and support pedestal 3, an outlet guiding and support pedestal 4, and a pipe drive pedestal 5.

Through the bottom of the open framework there extends a horizontal shaft 21 driven by a motor 20 through suitable reduction gearing. This shaft passes through bearings 22 supported by channels on the framework 1 and carries five drive pulleys 23 for the wrapping mechanisms which will be described below. Beneath the output driving pedestal 5 there is a worm gear 24 on the shaft 21 driving a chain 25 through a sprocket 45. This chain drives a sprocket 46 connected to a drive roll of the pair of wringer rolls 7. The drive roll also drives through a chain 26 the driving roll of a second pair of wringer rolls 8 which are supported on the framework 1 at a lower point than the rolls 7. There is also an idler roll 9 in the framework, the function of which will be described below.

The pipe forming mechanism proper will be described in conjunction with the operation of the machine which makes the arrangement of elements and their co-action more clear. Turning to FIG. 1B, it will be seen that an inner liner or thermoplastic pipe 36 passes through the set of washing machine wringer rolls 6, which are not power driven and which provide a suitable back tension to prevent wrinkling of the inner thermoplastic liner during the pipe forming operations. All of the washer wringer rolls, both the free running pair 6 and the driven pairs 7 and 8, are provided with conventional tension adjusting screws 48. As the construction of the wringer rolls and their tensioning adjustment is conventional, these elements are shown in simplified form on FIGS. 1 and 1B. It is an advantage of the invention that these elements can be of standard design and do not require special construction.

The finished pipe 39 is drawn at a predetermined rate by the power driven wringer rolls 7 and 8. In order to make it unnecessary to apply excessive pressure by the pressure adjustments 48, the idler roll 9 is provided so that the sharp change of direction in the finished pipe which it produces increases the friction of the driving rolls 7 and 8 and prevents slippage.

As the pipe is drawn, including the thermoplastic inner liner 36, this passes onto the rounded end of a floating mandrel 10, which is the most important and essential novel feature of the present invention. The mandrel, with the pipe moving along it, is maintained in a constant horizontal position by pairs of free running rollers 11, 12 and 13. In FIGS. 1A and 1B only one of each pair of rollers is shown as the section of these two figures is through the center of the mandrel 10. Vertical positioning of the mandrel with the pipe running over it is provided by free running rolls 14, 16 and 18, which are positioned in slots 15, 17 and 19. The spacing is such that there is an easy fit of the rolls on the pipe, as it is built up layer by layer, which will be described below, and it is not necessary to apply constant spring tension as is the case with the drive rolls 7 and 8 and the free running rolls 6. The slots 15, 17 and 19 permit adjustment of the spacing of the rolls 14, 16 and 18 to accommodate different sizes of pipe, which of course use different mandrel sizes. It is an advantage of the present invention that mandrels can be changed for different pipe sizes quickly and easily, and the machine is therefore quite versatile, being useful for the forming of composite pipes of practically all usual diameters. The possibility of adjustment for different pipe sizes and different mandrel sizes is an advantage of the preferred form of the present invention, but of course the essential features of a floating mandrel are equally applicable for a single size of pipe, in which case the guide rolls 14, 16 and 18 can be fixed in a single predetermined spacing. In a similar manner, the guide roll pairs 11, 12 and 13 are also adjustable, but this is not shown in the section constituting FIGS. 1A and 1B.

It should be noted that the plastic inner liner 36 is greatly exaggerated in thickness for clarity as compared to the size of the mandrel 10, and in a similar manner the layers of reinforced thermosetting impregnated tapes are indicated only diagrammatically in FIGS. 1A and 1B. They are shown in more detail on the enlarged scale appearing in FIGS. 4 and 5.

Reference has been made to five drive pulleys 23 on the shaft 21 and belts 27. Each of these drives a disc in a framework, which is shown in more detail for one tape winding station in FIG. 2. A disc 28 is driven by the belts 27 at each of the five points, the disc being supported in frameworks 43 for each station. Each disc 28 carries two reels, a large reel 29 and a small reel 30. The reels 29 carry a thermosetting resin impregnated tape 37, for example an epoxy resin impregnated glass fabric, and the layers of tape are kept from sticking to each other by a thin plastic ribbon 38, which may, for example, be of polyethylene. The sides of the reels 29 and 30 are held in snug fit for the tapes 37 and 38 by means of the spring tensioners 31 for the large reels 29 and two spring tensioning mechanisms 32 for each small reel 30. Two tensioning means are used here as the thin protecting ribbon 38 has practically no lateral rigidity and, therefore, a single tensioning means as is shown for the reels 29 and cause non-uniform spacing of the ends of the small reels 30. The reels 29 are mounted on the discs 28 by the curved mounting arms 34, and the small reels 30 are similarly mounted by curved arms 35; the former show only on FIGS. 1A and 1B, but the latter can also be seen on FIG. 2. The relative position of the discs 28 are somewhat different in FIGS. 1A and 1B than in FIG. 2, the latter showing the discs turned in such a way that the axles of the reels 29 and 30 are substantially in the same horizontal plane, which facilitates illustration.

As the discs 28 turn, the thermosetting resin impregnated tapes 37 are spirally wound around the moving inner thermoplastic pipe or liner 36. The gearing of the drive for the rolls 7 and 8 and the belt reduction for the discs 28 are so chosen that the spiral windings butt against each other with only a minimum spacing to prevent wrinkling. The mechanism of the spiral winding is substantially similar to that of prior machines either with pneumatic mandrels or with fixed rigid mandrels for discrete pipe lengths. It is an advantage of the present invention that the standard design of mechanism can be used without substantial change.

Figure 4:
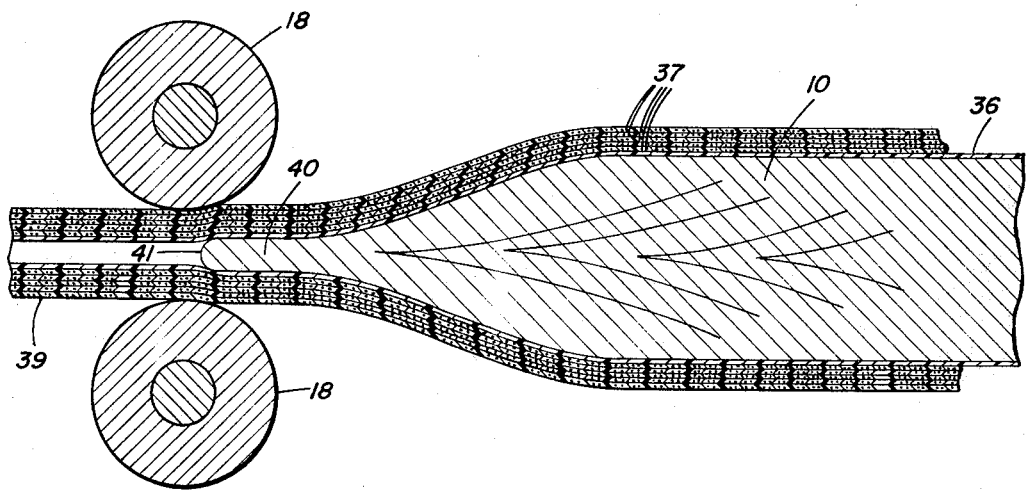
FIG. 4 is a section through the completed pipe at one end of the mandrel.

We now come to an essential feature of the present invention. The mandrel 10 is a floating mandrel, but it must be prevented from moving axially, and this is effected by flattening out one end of the mandrel to form a duck bill shape, which can be seen at the lower left hand end in FIG. 3. The flattened duck bill portion 40, which also shows in FIG. 1A in section, is wider than the diameter of the mandrel 10, so that when the composite pipe is pulled over it is flattened to assume the shape which can be seen in FIGS. 4 and 5. FIG. 4 shows a section through the end of the mandrel 10 with the duck bill omitting the rollers, and FIG. 5 shows a section through the flattened pipe 39 beyond the drive rolls 8.

In order to prevent the mandrel 10 from moving to the left, the two rolls 18 compress the pipe beyond the convex portion at the tip of the duck bill, which is shown at 41 in FIG. 3. This prevents axial movement of the mandrel 10 and keeps it floating. The end of the mandrel curves gradually from the round cross section of the main part of the mandrel to the flattened cross section of the end of the duck bill, as is shown at 42. This curvature gradually and uniformly changes the section of the pipe from the round cross section on the main portion of the mandrel to the flattened cross section after it has left the tip of the duck bill. The pipe is supported throughout this portion of its travel so that no wrinkles form as it gradually changes in cross section from the round cross section of the main part of the mandrel to the flattened duck bill. This duck bill shape of mandrel in cooperation with the rolls 18, and of course the guiding rolls 11, 12, 13, 14, 16 and 18, constitute essential features of the present invention.

Figure 5:
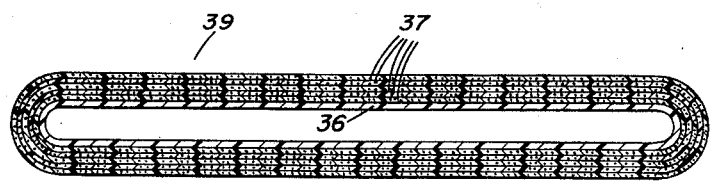
FIG. 5 is a section through the composite pipe after it has left the mandrel and has been flattened.

FIGS. 4 and 5 show on the enlarged scale a cross section not only of the thermoplastic inner liner 36 but the spiral layers of the impregnated tape 37. As this is an impregnation of a fabric, such as a glass fabric, the yarns of the fabric are shown by dots. While the exaggeration of the thickness of the layers of the pipe is not as great in FIGS. 4 and 5 as in FIGS. 1A and 1B, there is still considerable exaggeration so that the five layers on the inner liner 36 can be clearly shown. Even with the exaggeration in size of these layers the number of yarns of the fabric are not shown in detail, the dots being spaced quite widely apart to show the fabric in a purely diagrammatic form. As in many composite pipes, this fabric may be woven, braided, or of any other form. The exact form of the impregnated fabric is of course of no concern in the present invention, which can use any conventional design of impregnated tape. It should be noted that the impregnated tape is not thermoset, although it is sufficiently cured so that there is no excessive tackiness in the pipes shown in FIGS. 4 and 5. As has been described in the introductory portion of this specification, the pipe of course is wound up on reels, and when used is inflated and subjected to a suitable temperature to effect final curing of the thermosetting resin to form a rigid, reinforced composite pipe.

The thermosetting resin impregnated tapes have been described particularly as epoxy resin impregnated fiberglass, which is very satisfactory material, but of course the invention is not limited to this particular material, and other well known types of impregnated tapes may be used. In this respect the present invention is just as versatile and flexible as the previously used processes, so that the advantages of the floating mandrel, which is the essential feature of the present invention, are obtained without any offsetting disadvantages.

As has been described above, the thermoplastic inner liner 36 may be of any suitable material, such as for example polypropylene. Its function is primarily to provide the tight inner seal of the composite pipe which is not affected by liquids or gases which flow through the pipe. The polyolefins, such as polypropylene, are very desirable as they are chemically extremely inert and permit the production of pipes for quite corrosive materials. Of course where a pipe is to be used with materials which would tend to attack polyolefins, a different form of thermoplostic inner liner must be used. The invention of course is not concerned with the chemical nature of the inner liner so long as it has sufficient physical strength to be moved along the floating mandrel without tearing or wrinkling. It has been mentioned before that the inner liner is pulled along the mandrel by the rolls 7 and 8 against a certain amount of back tension from the pair of rolls 6. This tension is adjusted to be sufficient to prevent wrinkling, but of course is well within the strength limits of the thermoplastic inner liner 36. The need for a certain modest degree of physical strength in the thermoplastic liner does not create any significant limitation as the ordinary materials which are usable for this purpose have more than adequate strength.

In FIGS. 1A and 1B and in FIG. 4 the mandrel 10 is represented as being made of wood and as being solid. This is a very satisfactory material for use in the present invention as it can be given a very smooth polished surface which does not require undue power in moving the inner liner 36 along it and does not create the hazards of tearing the liner. For small composite pipe a solid mandrel is quite satisfactory as this is not excessively heavy in wood. However, for large pipes the mandrel may be hollow if desired to save weight, and of course it may be made of any suitable material which permits a polished outer surface; for example the mandrel may be of metal, such as aluminum, hollow steel, and the like, or also of rigid plastic. The present invention of course is not concerned in the slightest with the chemical composition of the floating mandrel so long as the mandrel is of adequate rigidity and smoothness of surface. This wide versatility of the invention constitutes a practical operating advantage.

The description in connection with the drawings has been of the preferred pre-formed thermoplastic liner type. When the other modification, where the liner is formed from a continuous sheet, is to be employed, the folding and sealing means must be provided at the end of the mandrel. These meachnisms are no different with the floating mandrel of the present invention than they are with the inflated mandrel and therefore require no specific illustration.

The description of the drawings has been in connection with a mandrel having a smooth polished surface but without added lubricants. Where the fit of the thermoplastic liner is not too snug, this operates satisfactorily. However, some batches of liner may be near the lower limit of diameter provided in the normal tolerance for the tubing. In such case, the fit is more snug and it is sometimes desirable to apply some lubricant, either liquid or solid, to the mandrel before the operation is started. For example, the mandrel may be dusted with talcum before starting up.

We claim:

1. An apparatus for continuous production of long lengths of composite plastic pipe, the pipe comprising an inner liner and at least one layer of reinforced thermoset resin comprising,
    (a) a floating, relatively rigid mandrel having one rounded end and the other end flattened in the form of a duck bill projection, the mandrel being supported by a plurality of horizontal and vertical guide rolls,
    (b) driven roll means for pulling the composite pipe leaving the duck bill end of the mandrel and means for feeding a continuous flexible inner liner over the rounded end of the mandrel,
    (c) means for spirally winding reinforced thermosetting resin about the liner on the mandrel,
    (d) means for preventing axial movement of the duck bill end of the mandrel while permitting composite pipe leaving said end to move, and
    (e) means for synchronizing the composite pipe pulling means and the spiral winding means to produce at least one spirally wound layer on the inner liner without wrinkles.

2. An apparatus according to claim 1 in which the means for spirally winding the reinforced thermosetting resin comprises at least one disc rotating around the mandrel and provided with a tape supply reel.

3. An apparatus according to claim 2 in which the reinforced thermoplastic resin is in the form of a tape on a reel with an inter-leaving thin tape of material which does not adhere to the reinforced resin, and a second reel is provided, synchronously driven with the reinforced thermosetting resin tape reel, and positioned to wind up the thin ribbon as the tape is spirally wound around the mandrel.

4. An apparatus according to claim 1 in which the means for moving the pipe over the mandrel comprises a pair of driven rolls, an idler roll positioned to cause a sharp change of direction of the pipe, and a second set of rolls positioned with respect to the idler roll so that a second abrupt change of direction results whereby adequate friction between the rolls and the flattened pipe leaving the duck bill is provided without excessive roll pressure.

5. An apparatus according to claim 1 in which the duck bill extends out beyond the circumference of the mandrel sufficiently to flatten the pipe leaving it.

References Cited

UNITED STATES PATENTS

| 3,067,803 | 12/1962 | Fleury | 156—431 |
| 3,200,022 | 8/1965 | Matton | 156—432 |
| 3,407,107 | 10/1968 | Skoggard et al. | 156—432 |

BENJAMIN A. BORCHELT, Primary Examiner

T. H. WEBB, Assistant Examiner

U.S. Cl. X.R.

156—428

PO-1050
(5/69)

UNITED STATES PATENT OFFICE
CERTIFICATE OF CORRECTION

Patent No. 3,506,522          Dated April 14, 1970

Inventor(s) Michael John Onifer, Robert Thomas Hull and Edward John Ardolino

It is certified that error appears in the above-identified patent and that said Letters Patent are hereby corrected as shown below:

Column 3, line 42, "1" should read -- 1A --.
Column 4, line 34, "and" should read -- could --.

SIGNED AND
SEALED
SEP 22 1970

(SEAL)
Attest:

Edward M. Fletcher, Jr.
Attesting Officer

WILLIAM E. SCHUYLER, JR.
Commissioner of Patents